United States Patent Office 2,839,219
Patented June 17, 1958

2,839,219

RESINOUS POLYAMIDE COMPOSITION AND PROCESS OF PREPARING THE SAME

James H. Groves, Lombard, and Gerald G. Wilson, Kankakee, Ill.; said Wilson assignor to General Mills, Inc., a corporation of Delaware No Drawing. Application November 30, 1953
Serial No. 395,264

8 Claims. (Cl. 220—81)

The present invention relates to a novel resinous polyamide composition which is particularly adapted for use as an adhesive and to the process of preparing the same.

The invention disclosed herein is related to and an improvement of the invention disclosed in copending application Serial No. 385,887 filed October 13, 1953, in the name of James H. Groves.

The composition of the present invention is composed of a blend of a hard and tough polyamide resin derived by the condensation of an aliphatic polyamine with a mixture of acids including polymeric fat acids, and a softer tacky polyamide resin made by the condensation of a polyalkylene polyamine with polymeric fat acids. This blend of polyamide resins is then subjected to a heat treatment which serves to modify the chemical and physical properties of the composition such that a composition particularly adapted for use as an adhesive is obtained.

It is therefore an object of the present invention to provide a novel resinous polyamide composition that is particularly adapted for use as an adhesive.

It is also an object of the present invention to provide an improved polyamide adhesive composition in which the improvement is due principally to the heat bodying of the polyamide resin constituting the major proportion of the composition.

It is another object of the present invention to provide a tough flexible, resilient, polyamide composition which is heat stable and solvent resistant and which is composed of a blend of two different polyamide resins combined and reacted in a specific manner.

It is another object of the present invention to provide a tough rubbery polyamide resinous composition having excellent properties of solvent resistance and adhesiveness for bonding to wood, metal, fiber, and other materials.

It is a further object of the present invention to provide a process of preparing the above product.

While the products of the present invention are of general utility as adhesives and otherwise, they are particularly adapted for use as adhesives or cements for sealing seams in metallic containers. In this respect they may be used to replace metallic cements, such as solders.

In making metallic containers, such as cans, the operation is highly mechanized and automatic devices are used which serve to form and shape the parts and to bring the parts together for formation of seams. These devices are mechanically timed and operate at high rates of speed. Successive parts to be joined follow one another in very short intervals. Moreover automatic can-making machines are equipped with thermostatically controlled heaters which heat the adhesive to a specific and limited temperature range at which the adhesive is soft or liquid. It is essential therefore that the adhesive at this temperature be sufficiently soft and have suitable viscosity characteristics such that it will flow onto the seam portion of the can and such that it will develop adhesive characteristics within a certain limited period of time. It is essential not only that the adhesive possess the requisite adhesive characteristics but also that these characteristics do not change when a quantity of the adhesive is held in the molten condition for a considerable period of time. For example, there should be no appreciable change in the melting point of the adhesive while it is being held at application temperature since this might affect the ability of the adhesive to adhere to the can part or its ability to set up within the required short interval involved in the seam making operation.

In addition to these melting point characteristics an adhesive intended for this type of application must possess other physical and chemical characteristics. The material should be tough and resilient so that the seams will not fail when the can is subjected to the ordinary handling in manufacture, packing and shipping.

Furthermore, the adhesive should be resistant to the materials which are packed in the can. Thus in the case of cans for food products the adhesive should not in any way be affected by the food products nor should the adhesive be in any way toxic. In the case of cans for solvents and oils the adhesive should not be soluble in these materials but should retain its adhesive properties under these circumstances.

The compositions of the present invention are well suited for these applications either as adhesives for interfolded side seams of sheet metal containers or as gasket material for the end seams of sheet metal containers. The adhesive may be used on enameled or coated steel or tin plate or for uncoated steel or tin plate, aluminum, copper, and bronze. The products are heat stable and relatively little change in melting point is observed as the product is held in the molten state for an extended period of time. The adhesive is nontoxic and accordingly can be used in the seams of food containers, likewise, it possesses the requisite adhesive and cohesive strength for these applications. In addition the material is tough and resilient and does not tend to be brittle. In this way can seams remain intact during the usual conditions of handling both in the fabrication of the can as well as in the packing of the can and its shipment through the ordinary channels of distribution. The adhesive likewise is relatively inert to materials like lubricating oils, alcohols, and numerous other solvents and accordingly containers fabricated with these seams may be used for handling products of this nature.

As was pointed out above, the composition of the present invention is composed of a blend of two polyamides, hereinafter referred to as Resin A and Resin B. It has been discovered that by heat bodying Resin A, i. e. holding the resin in a molten state for a period of time to effect an increase in its viscosity, and thereafter combining it with a lesser portion of Resin B and heat treating the mixture in a manner more fully described, hereinafter, an adhesive composition results which not only has the desirable properties described above but is also superior to similar prior polyamide resin adhesives.

Both of these resins are prepared at least in part from polymeric fat acids. These polymeric fat acids may be either saturated or unsaturated and may be derived by the thermal polymerization or catalytic polymerization of higher fatty acids such as those having 12 to 22 carbon atoms. Acids derived from drying or semi-drying oils are especially suitable and include soybean, linseed, tung, perilla, oiticia, cottonseed, corn, tall, sunflower, safflower, dehydrated castor oil acids and the like. Linoleic acid is widely available from natural sources and is especially suitable for preparation of polymeric fat acid. Monoolefinic acids such as oleic may also be dimerized for this purpose but usually by a catalytic process.

The polymeric fat acids usually obtained from a mixture of fat acids will be composed of a very large proportion of dimeric fat acids together with some higher polymeric fat acids and some residual monomer. Some monomer is desirable in the mixed acids for the purpose of controlling polymer size in the polyamide reaction. Monomer may be either removed from the polymeric fat acids or added thereto until a desired quantity is present.

RESIN A

Resin A is a condensation product of polymeric fat acids and a polyalkylene polyamine. Suitable polyalkylene polyamines include diethylene triamine, triethylene tetramine, tetraethylene pentamine, 3,3'-imino-bispropylamine, and the like. Thus these polyalkylene polyamines contain two primary amine groups and from one to 3 secondary amine groups, all separated by short chain alkylene groups having 2 to 4 carbon atoms. The ratio of equivalents of polyamine to equivalents of carboxyl should be such that cross linking and hence gelation are avoided. For example in the case of diethylene triamine a ratio of 1½ equivalents of amine to 1 equivalent of carboxyl is preferred, taking into account the total carboxyl in the polymeric fat acid mixture including the monomer as well as the higher polymers present. In the case of triethylene tetramine a higher amine ratio such as 2.6 equivalents of amine per equivalent of carboxyl is preferred. In general, the higher the amine functionality of the polyamine the higher the ratio of amine equivalents per carboxyl equivalent that is required to produce a non-gelling polyamide. Accordingly the particular excess of amine to be employed in each instance can readily be determined. Usually it is not necessary to go outside the range of 1.3 to 3.0 equivalents of amine per equivalent of carboxyl.

The polymeric fat acids either in the form of the free acid or in the form of the lower alkyl esters thereof are reacted with the polyalkylene polyamine at a temperature of around 200° C. After about 2 hours at this reaction temperature the reaction mixture is subjected to a vacuum for the purpose of removing the volatile by-products of reaction. The condensation involves principally the primary amine groups but to some extent the secondary amine groups are also involved in the reaction.

At room temperature these resins are soft, tacky and resistant to greases, oils, water, water vapor, alkali, canpacking brines and syrups, and a number of organic solvents. The resins have an average molecular weight within the range of 2,500 to 6,500 and an acid number usually below 10.

In accordance with the present invention, it has been found that it is possible to modify markedly the characteristics of this resin by subjecting it to the bodying treatment following the condensation. As was pointed out above the condensation reaction does to some appreciable extent involve the secondary amine groups as well as the primary amine groups. It has been found that by subjecting the resin to a bodying treatment at an elevated temperature within the approximate range of 200–300° C. for a period of from 6–30 hours, it is possible to effect amide interchange between the secondary and primary amine groups within Resin A itself such that the characteristics of the resin are materially modified. It is found that the number of free secondary amine groups in the polyamide increases materially while the number of free primary amine groups decreases materially. The bodying is accompanied by some slight reduction in the acid number but this is not appreciable. This bodying treatment also affects the physical properties of the resin. It is found that there is a significant change in the viscosity of the resin. This increase in viscosity, as a result of the bodying treatment, may be from 1 to 2 letters on the Gardner-Holdt viscosity scale as determined on a 35% solution by weight in butanol-toluene, 1–1 or an increase of approximately 200 cps. on The Brookfield scale (20 R. P. M. 370° F. #4 spindle). It has been determined that for the purpose of the present invention the preferred compositions are those in which Resin A has been heat bodied to a Gardner-Holdt viscosity between C and F and especially those bodied to between D and E.

This bodying of the Resin A also improves the characteristics of the blend of polyamides in that an adhesive containing this bodied Resin A forms bonds which are materially stronger than an adhesive which contained unbodied Resin A of the same viscosity, wherein the viscosity was attained by a slight adjustment in the proportion of reactants. Thus a polyamide that has obtained a given viscosity as a result of bodying treatment subsequent to the condensation reaction possesses superior properties as compared to the identical unbodied polyamide and as compared to a polyamide which has attained the same viscosity during the condensation reaction through the use of modified reactant ratios.

RESIN B

Resin B is a high-melting brittle polyamide resin derived from a mixture of polymeric fat acids similar to those used in preparing Resin A and an additional polycarboxylic acid, the latter having at least 2 carboxyl groups which are separated by at least 3 and not more than 8 carbon atoms. Typical of such polybasic acids are the aliphatic acids, glutaric, adipic, pimelic, suberic, azelaic, and sebacic, and the aromatic acids, terephthalic and isophthalic acids. Instead of the free acids, the lower aliphatic esters or the anhydrides may be used. The melting point of the copolymer resin may vary within the range of 130–210° C. depending upon the particular relative reactant ratios as well as reaction conditions. Desirable copolymers from adipic acid melt at 200–205° C.; from sebacic acid at 170–190° C.; and from terephthalic acid at 165–170° C. In general these copolymer polyamide Resins B are prepared from a mixture of polycarboxylic acids containing from 85–98% by weight of fatty polymeric acids and from 2–15% by weight of the additional polycarboxylic acids.

In the preparation of Resin B the mixture of polybasic acids is reacted with an alkylene diamine in which the alkylene radical has from 2 to 4 carbon atoms such as ethylene diamine; 1,2- and 1,3-diamino-propane; 1,2-, 1,3-, and 1,4-diamino-butane, and the like. The reactants are mixed in approximately equivalent quantities and heated under essentially the same conditions as have been described for Resin A. However, when the condensation is substantially complete there is no need for subjecting Resin B to a bodying treatment although this is permissible.

Resin B at room temperature is a very hard copolymer which has good resistance to greases, oils, water and water vapor, alkalies, mild acids, can-packing brines and syrups, alcohols, and most organic solvents. The average molecular weight of Resin B is from 7,000 to 10,000.

Resin A and Resin B are then blended and subjected to an additional amide interchange reaction between the amino groups of both resins. For this purpose the resins are mixed in the relative proportions of from 60–75% of Resin A and from 25–40% of Resin B and preferably in the proportion of 65% of Resin A to 35% of Resin B. After extensive experimentation it was found that if the amount of Resin A is greater than 75% of the composition the resulting adhesive is too soft and lacks sufficient cohesive strength, while if the amount of Resin A is less than 60% of the composition the resulting adhesive is harder and less flexible.

The blending operation is for the simple purpose of securing a homogeneous reaction mixture and accordingly it may be carried out in many ways. Since however, it is desirable to have the amide interchange reaction take place uniformly it is preferred to effect a homogeneous blend of the 2 resins as rapidly as possible. For this purpose it is preferred to melt the lower melting Resin A and to disperse in this molten Resin A particles or pieces of resin B. These pieces should be egg size or smaller so that they will liquify rapidly and form a homogeneous mixture before any substantial quantity of Resin B which has first gone into solution, has had an opportunity to react with the resin A. The mixture is subjected to agitation to insure a homogeneous blend and the surface of the blended resins is maintained under an inert atmosphere to prevent oxidative deterioration.

Satisfactory blending can be accomplished at temperatures in the approximate range of 200–300° C. and preferably within the approximate range of 200–220° C. If blending is done below 200° C. the components lack sufficient fluidity for intimate mixing whereby a non-homogeneous composition results. When such non-homogeneous blends are then held molten at temperatures close to the melting point of the composition the higher melting Resin B has a tendency to separate and form gel particles in the mass. If too high a temperature is maintained during blending, the first portions of Resin B to melt may take part in the amide interchange reaction to some degree before the entire amount of Resin B becomes molten, and accordingly a non-uniform product may result.

During the blending operation it is necessary only to allow sufficient time to insure a homogeneous blend. The time interval is dependent upon the temperature of blending, the size of the Resin B pieces added, and the efficiency of agitation. We have found that by adding egg sized or smaller pieces of Resin B to molten Resin A at about 200° C. using a mechanically operated agitator a time interval of about 30–60 min. is sufficient.

The amide interchange reaction between Resin A and Resin B takes place readily at temperatures above approximately 200° C. and is accompanied by a rather rapid reduction in the melting point of the blends. As equilibrium is approached there is a sharp decline in the rate at which the melting point drops and consequently there is a leveling off in the curve obtained by plotting melting points against time. The product thus has a relatively stable melting point.

Further reaction is possible between the two resins which would to some extent result in a further melting point drop but the rate of this drop in melting point is very low.

A suitable temperature range for the amide interchange reaction is the range of 200–220° C. At 200° C. a period of about 16 hours is suitable while at 220° C. a time of about 1 hour is generally sufficient.

In order to determine a suitable time period at any given temperature the reaction may be carried on as follows: The blend of resins is held at a suitable reaction temperature and a sample is withdrawn at short intervals during the process for the determination of a melting point. By following the course of the reduction in melting point it is possible to determine the point at which the rate of melting point drop decreases sharply. Heating is then discontinued and the resin composition is removed from the reaction vessel and packaged for subsequent use.

*Example 1*

RESIN A 7,615 pounds polymeric fatty acids, 456 pounds of monomeric unsaturated fatty acids, and 1520 pounds of diethylene triamine were placed in a reaction vessel. The reaction vessel was then heated to about 200° C. and held there for about 3 hours, the last hour of which the vessel was maintained under a vacuum. The product thus obtained had a B–C Gardner-Holdt viscosity as determined on a 35% solution in toluene-butanol, 1:1. The resin was then maintained in the reaction vessel at approximately 205° C. for 16 hours additional at which time it had attained a D viscosity.

RESIN B

In a reaction vessel a uniform blend of acids containing 288.2 parts of polymeric fat acids, 31.7 parts of monomeric cottonseed fatty acids, and 31.7 parts of sebacic acid was heated to a temperature of about 130° C. Ethylene diamine (57 parts of 74.5%) was then added and the whole mixture raised to a temperature of about 200° C. The reaction mass was agitated to insure intimate contact of the several ingredients. The intimate mixture was maintained at approximately 200° C. for a total of about 4 hours, the last 2 hours of which it was maintained under reduced pressure. The vacuum was then broken by means of an inert gas and the heating discontinued. The product was filled into suitable containers and allowed to solidify.

65 parts of Resin A were placed in a closed reaction vessel equipped with a mechanical agitator. The charge was blanketed with an atmosphere of nitrogen and heat applied to the kettle to raise the temperature of approximately 200° C. Thereupon 35 parts of Resin B which had been reduced to egg size or smaller were charged into the kettle over a period of about 150 minutes while the kettle was maintained at approximately 220° C. The mixture was agitated during this period and after all of Resin B had been added, the heating was discontinued and the mixture was allowed to cool to 213° C. at which temperature it was maintained and agitated for an additional 180 minutes. Heating and agitation were then discontinued and the temperature of the blend allowed to drop to 209° C. The vacuum was then broken and the product packaged off.

After all of the Resin B had been added, the course of the amide interchange reaction was observed by removing a sample at intervals and checking its melting point. At the time all the Resin B had been added the blend was found to have a melting point of 192° C. and the time interval was measured from this point. The results are tabulated as follows, the time being the total elapsed time.

| Time (minutes): | Melting point (° C.) |
|---|---|
| 40 | 186 |
| 80 | 184 |
| 110 | 182 |
| 140 | 181 |
| 180 | 181 |

At this point the reaction was assumed to have reached equilibrium. The heating and agitation were then discontinued and the product allowed to cool preparatory to packaging it off. The melting point of the packaged material was found to be about 181° C. thereby indicating that equilibrium had been reached and that the melting point of the composition was substantially stable.

*Example 2*

28.5 pounds of dimer fat acids, 9.4 pounds of triethylene tetramine were placed in a reaction vessel and the vessel heated to 200° C. and held at that temperature for a total period of 3 hours, during the last two hours of which the vessel was maintained under vacuum. The vessel was then cooled to 175° C. and the product discharged under an inert atmosphere. This product had the following characteristics:

| | |
|---|---|
| Viscosity, Gardner-Holdt | A–2 |
| Acid No | 5.5 |
| Amine No | 221.7 |
| Percent primary amine | 51.1 |
| Percent secondary amine | 48.9 |

This product was then heated to 200° C. under a vacuum of 10 mm. with agitation for 10½ hours. At this point the product had the following properties:

| | |
|---|---|
| Viscosity Gardner-Holdt | A-1 |
| Acid No. | 3.5 |
| Amine No. | 208.4 |
| Percent primary amine | 49.5 |
| Percent secondary amine | 50.5 |

The product was then bodied further. It was heated to a temperature of 200–210° C. for an additional 12 hours under a vacuum of 15 in. of mercury, with agitation. Thereafter the product had the following characteristics:

| | |
|---|---|
| Viscosity, Gardner-Holdt | B-C |
| Amine No. | 205 |
| Acid No. | 4.7 |
| Percent primary amine | 39.7 |
| Percent secondary amine | 60.3 |

This resin may be substituted for the Resin A described in Example 1 and a bodied blend prepared from the mixture of this resin and Resin B to produce an ultimate adhesive which has similar properties to the final product of Example 1.

For the properties listed therein, the table below shows the difference between a blend of 65 parts of Resin A and 35 parts of Resin B prepared according to the present invention and the same blend not so prepared. Column I gives the data relative to a blend of Resin B with a non-heat bodied Resin A, the Resin A having a viscosity of about 200 cp. or A on the Gardner-Holdt scale. Column II gives the data relative to a blend similar to that in column I except that the Resin A of I has been heat bodied as described hereinbefore to a viscosity of 690 cp. or D on the Gardner-Holdt scale prior to blending with Resin B.

| Property | I | II |
|---|---|---|
| Dennis Bar, M. P., ° F. (initial) | 370 | 370 |
| Dennis Bar, M. P., ° F. (after heating for 3 hours at 420° F.) | 340 | 350 |
| Rate of M. P. decline when held for 6 hours at 370° F. in ° F. per hour (heat treated blend) | 3.0 | 2.0 |
| Viscosity change during 6 hour heating above | 0 | 0 |
| Mooney viscosity at 190° F. for a 2 minute reading | 13.5 | 23.5 |
| Mooney elastic recovery at 190° F. for 60 sec | 26 | 35 |
| Rex hardness at 70° F | 90 | 90 |
| Peel strength at 180° angle of bonded sheet metal strips pulled over rollers in pounds per ¾ lineal inch | 18.3 | 27.5 |

We claim as our invention:

1. A resin composition having a substantially stable melting point when held in a molten state, comprising a homogeneous blend of from 60 to 75% by weight of polyamide Resin A and from 25 to 40% by weight of a polyamide Resin B, said Resin A being the reaction product of a polymeric fat acid and a polyalkylene polyamine, the polyalkylene polyamine being employed in a ratio of 1.3 to 3.0 equivalents of amine per equivalent of carboxylic acid, said Resin A having been subjected to a bodying treatment at 200° to 300° C. to effect an increase in Gardner-Holdt viscosity of at least one letter, said Resin B being the reaction product of an alkylene diamine and a mixture of a polymeric fat acid and a polycarboxylic acid selected from the group consisting of aliphatic and aromatic polycarboxylic acids in which the carboxyl groups are separated by from 3 to 8 carbon atoms, the blend of Resin A and Resin B having been treated at a temperature within the approximate range of 200° to 220° C. for a time sufficient to effect an amide interchange between the resins.

2. A product according to claim 1 in which the polyalkylene polyamine is diethylene triamine, the alkylene diamine is ethylene diamine, and the polycarboxylic acid is sebacic acid.

3. A plurality of metal layers selected from the group consisting of steel, aluminum, copper and bronze having the composition of claim 1 between adjacent surfaces of said layers as a hermetic bonding material.

4. A plurality of tin plate layers having the composition of claim 1 between adjacent surfaces of said layers as a hermetic bonding material.

5. A plurality of steel layers having the composition of claim 1 between adjacent surfaces of said layers as a hermetic bonding material.

6. A container made of a metal selected from the group consisting of steel, aluminum, copper and bronze having the composition of claim 1 interposed between interfolded metal layers composing a seam of said container.

7. A method of forming a homogeneous resin composition having a substantially stable melting point when held in a molten state, comprising intimately blending a polyamide Resin A which is the reaction product of a polymeric fat acid and a polyalkylene polyamine, the polyalkylene polyamine being employed in a ratio of 1.3 to 3.0 equivalents of amine per equivalent of carboxylic acid, said Resin A having been subjected to a bodying treatment at 200° to 300° C. to effect an increase in Gardner-Holdt viscosity of at least one letter, with polyamide Resin B which is the reaction product of an alkylene diamine and a mixture of a polymeric fat acid and a polycarboxylic acid selected from the group consisting of aliphatic and aromatic polycarboxylic acids in which the carboxyl groups are separated by from 3 to 8 carbon atoms, and subjecting the blend to a temperature within the approximate range of 200° to 220° C. for a time sufficient to effect an amide interchange reaction between the resins.

8. Process according to claim 7 in which the polyalkylene polyamine is diethylene triamine, the alkylene diamine is ethylene diamine, and the polycarboxylic acid is sebacic acid.

References Cited in the file of this patent

UNITED STATES PATENTS

| | | |
|---|---|---|
| 2,339,237 | Brubaker et al. | Jan. 18, 1944 |
| 2,450,940 | Cowan et al. | Oct. 12, 1948 |

OTHER REFERENCES

Anderson et al.: J. Am. Chem. Soc. 70, February 1948, pp. 760–763.

Oil and Soap, 21, April 1944, pp. 101–107.